Jan. 9, 1934.  A. R. THOMPSON ET AL  1,943,278
METHOD OF AND APPARATUS FOR CLASSIFYING FRUIT AND VEGETABLES
Filed April 14, 1930    3 Sheets-Sheet 1

Inventors
Albert R. Thompson
Kaare Omsted
By Lyon & Lyon
Attorneys

Jan. 9, 1934.  A. R. THOMPSON ET AL  1,943,278
METHOD OF AND APPARATUS FOR CLASSIFYING FRUIT AND VEGETABLES
Filed April 14, 1930   3 Sheets-Sheet 2

Inventors
Albert R. Thompson
Kaare Omsted
By Lyon & Lyon
Attorneys

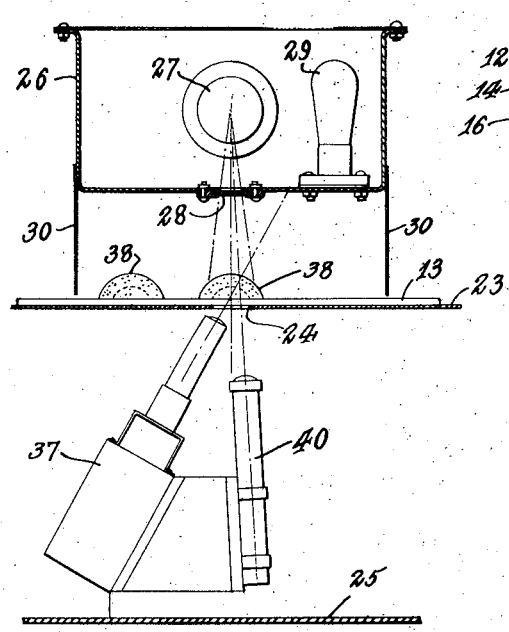
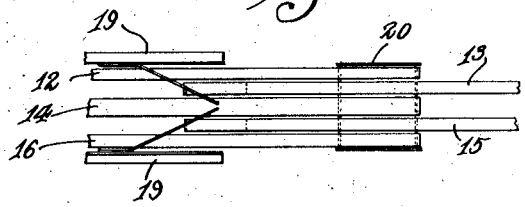
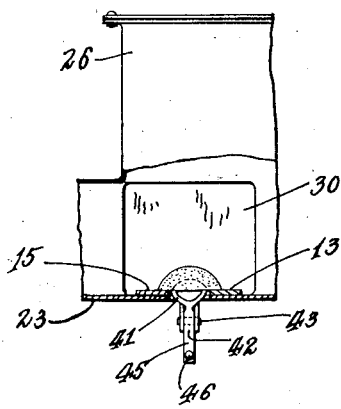
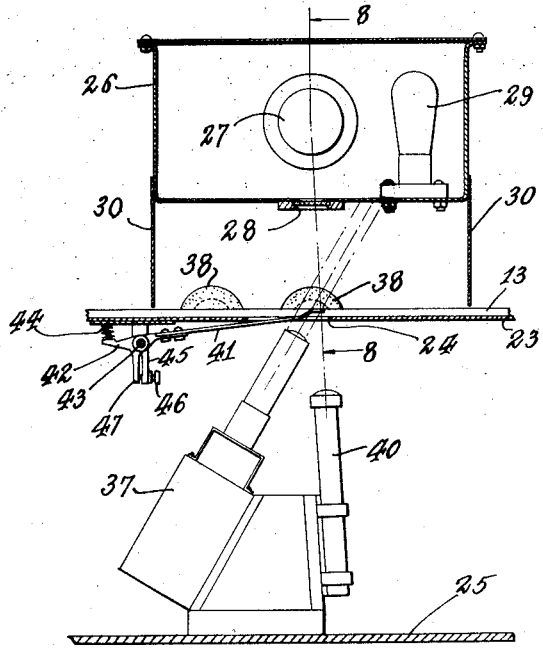

Patented Jan. 9, 1934

1,943,278

UNITED STATES PATENT OFFICE 1,943,278

METHOD OF AND APPARATUS FOR CLASSIFYING FRUIT AND VEGETABLES

Albert R. Thompson and Kaare Omsted, San Jose, Calif., assignors, by mesne assignments, to Pacific Machinery Company, San Francisco, Calif, a corporation of California Application April 14, 1930. Serial No. 444,049

13 Claims. (Cl. 209—111)

This invention relates to a method and apparatus for automatically and continuously classifying fruit as to degree of maturity thereof, and is particularly adapted for so classifying fresh fruit preparatory to canning, packing or preserving. It is to be understood, however, that the method of this invention is also applicable to the classification of all food products, such as vegetables and fruits both fresh and dried, which vary in color or permeability to light, such color or permeability being an indication of the maturity or character of the fruit or vegetable.

Color is one indication of the maturity or character of a fruit or vegetable. Fresh fruits such as peaches, apricots and the like vary in color with maturity and ripeness. Dried fruit such as peaches, pears, apricots, etc., and raisins, prunes and the like also vary in color.

In dried fruit color is an indication of either the maturity of the fruit at the time of drying, or of changes which have occurred in the fruit since drying, sulphuring or other processing which it may have received. As a general rule, deterioration in dried fruit is accompanied by darkening.

The variations in color which are of commercial importance are visually noticeable but are insufficient to normally permit automatic classification by means of photoelectric cells energized by light reflected from the fruit. A so-called green peach unsuitable for canning purposes may be a light yellow in color and reflect even more light than a ripe peach which is a reddish-orange in color, or a peach which is a greenish-yellow in color will reflect the same quantity of light as a ripe orange peach. For this reason reflection of light from fruits and classification by means of photoelectric cells energized by such reflected light can not be employed.

Heretofore, all attempts to segregate materials by color alone relied upon the quantity of light absorbed by the surface of the material and the intensity of light reflected from the surface of the material. As stated hereinabove, such reflection methods are unsatisfactory for the reason that the intensity of light reflected from materials of different colors does not differ sufficiently to permit of accurate classification.

The problem presented by the above conditions has been solved in a novel manner by the method of this invention. Briefly stated, the method disclosed herein comprises projecting light of substantially uniform intensity and character through the fruit or vegetable which it is desired to classify, measuring the amount of light transmitted through the fruit by suitable photoelectric means, and then sorting the fruit or vegetable according to a predetermined scale of transmitted light intensities.

The apparatus for carrying out the method may be automatic and continuous in operation, automatically discarding fruit which does not transmit a predetermined quantity of light or a quantity of light insufficient to properly energize the photoelectric cells.

For purposes of illustration the invention will be described as applied to the automatic and continuous classification of fresh fruit, such as peaches. In describing the invention reference will be had to the appended drawings, in which:

Fig. 4 is an enlarged plan view of a portion of the apparatus shown in Fig. 3.

Fig. 5 is a longitudinal vertical section through a portion of the mechanism shown in Figs. 2 and 3 illustrating a modification.

Fig. 7 is a longitudinal vertical section similar to Figure 5 illustrating a form including a mechanically operated circuit breaker.

Fig. 8 is a transverse section of a portion of the device shown in Fig. 7.

Fresh fruit such as peaches (which will be used hereafter in describing the invention, for illustrative purposes) are delivered to the packing houses in different states of maturity or ripeness. It is necessary to segregate the fruit so that the green fruit are stored away until ripe, or discarded with the over-ripe or spoiled fruit. It is desirable that fruit of uniform size and degree of ripeness be used, particularly for the better brands of canned, packed or preserved fruit.

The classification of the fresh fruit may be accomplished on either peeled or unpeeled fruit. In certain cases it is more desirable to classify the fruit according to ripeness before peeling.

Many fruit are peeled by means of lye baths and the green fruit requires a longer and more active lye treatment than ripe fruit. By classifying the fruit before peeling, the lye bath can be rendered more appropriate to the fruit actually being peeled. In other cases it may be desirable to first grade the fruit according to size before classifying each size as to ripeness.

The sequence of steps to which fresh fruit such as peaches is subjected in a canning process, includes as a result the following steps:

(1) The peaches are cut and halved; (2) they are pitted; (3) the halves are then sent to peeling machines or a lye peeler; (4) the peeled peaches are washed; (5) they are then graded as to size; (6) they are then classified as to the maturity of the peach or degree of ripeness of each half; (7) the classified peaches are then sent to the cans; (8) the filled cans are syruped; (9) the syruped cans are sent to an exhaust box and subjected to a vacuum treatment prior to sealing; (10) the exhausted and sealed cans are set to a cooker or sterilizer; (11) the sterilized cans are cooled; (12) the sterilized and cooled cans are then labeled and crated or boxed.

As stated hereinabove, the particular sequence of steps may be varied so that the classification as to degree of ripeness or maturity may occupy a different position in this sequence of steps. For the purpose of this description it will be assumed that the classification of fruit as to degree of ripeness is to be accomplished after peeling and grading as to size.

Figure 3:
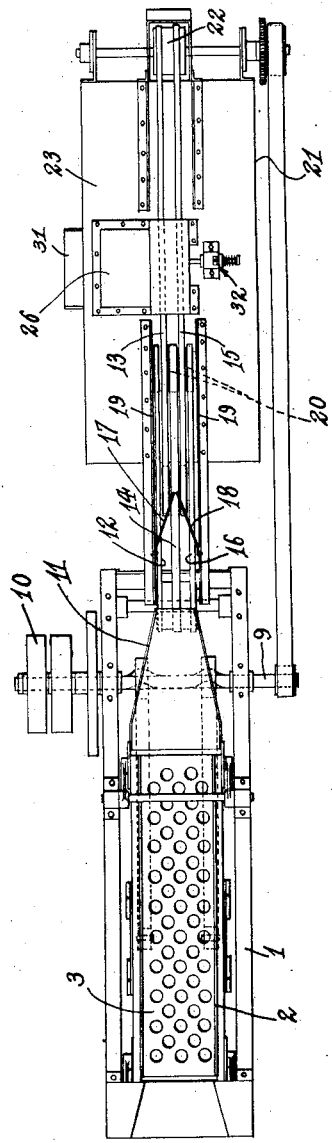
Fig. 3 is a plan view of the apparatus shown in Fig. 2.
Figure 2:
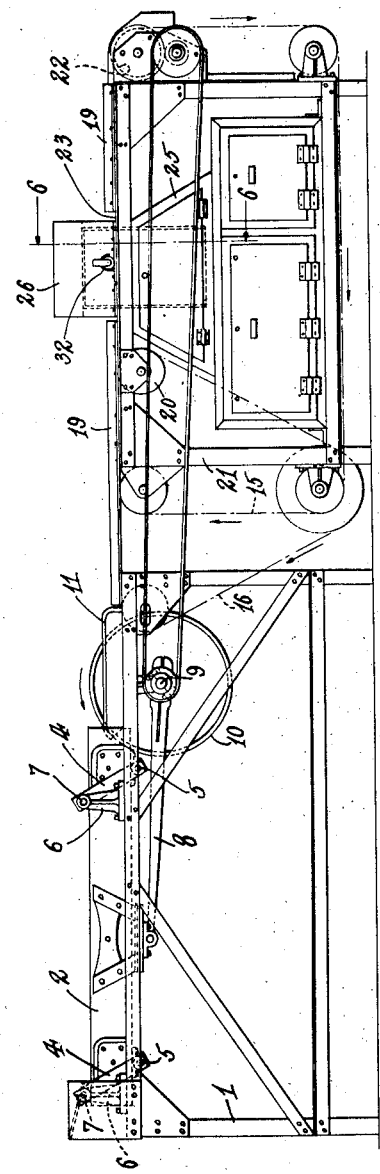
Fig. 2 is a side elevation of an apparatus which may be employed in carrying out the invention.

The halved, pitted, peeled and graded peaches may be sent to a feed shaker table, such as is shown in Figs. 2 and 3. The table may be of any desired construction, but preferably includes a frame 1 in which there is suspended an open ended tray 2. The tray 2 may be provided with a perforated bottom 3, the perforations varying in size with the size of the fruit which it is desired to feed through the machine.

The tray 2 is suspended by means of links 4 pivotally connected to the tray as at 5 and to trunnions 6 as indicated at 7. A rapid oscillating motion may be imparted to the tray 2 by means of a rod or rods 8 connected to a crank shaft 9 journaled in suitable bearings carried by the frame 1. Rotation of the crank shaft 9 may be imparted in any suitable manner, as for example, by means of pulleys 10 and a suitable belt drive thereover.

The chief object of the shaker table 1 is to arrange the halved peaches so that they will rest on their cut surfaces with the pit cavities down. It is to be understood that the halved peaches are supplied indiscriminately to the shaker table 1, but the oscillatory vibration of the tray 2, together with the perforated or corrugated bottom 3 of the tray 2 causes the halved peaches to turn over if they reach the shaker table with the pit cavities up, so that all of the peaches discharged from the shaker table through the chute 11 are properly positioned with the pit cavities down.

The chute 11 may discharge the peaches onto a plurality of conveyor belts, such as for example the conveyor belts 12, 14 and 16. These conveyor belts are preferably spaced from each other a distance somewhat less than the diameter of the smallest fruit which it is desired to handle on the machine. Furthermore, the belts 12, 14 and 16 should not exceed in width minimum diameters of the peaches which it is desired to handle. In the spaces between the belts 12, 14 and 16 a pair of belts 13 and 15 may be positioned.

The peaches discharged onto the conveyor belts 12, 14 and 16 may be centered on the belt 14 in any suitable manner, as for example by means of elastic members 17 and 18 attached to the sides 19 of the trough in which the conveyor belts run. The spring members 17 and 18 may be inclined to the horizontal so as to tangentially contact with the upper convex surfaces of the peaches on the belts 12, 14 and 16. Furthermore, the linear speed of the belts 13 and 15 may be somewhat in excess of the linear speed of the belts 12, 14 and 16. In this manner the peaches from the belts 12, 14 and 16 may be fed onto the central belt 14 and then removed therefrom by the more rapidly moving conveyor belts 13 and 15, so that the peaches on the belts 13 and 15 will be supported thereon and will be in spaced relation to each other.

The belts 13 and 15 extend beyond the ends of conveyor belts 12, 14 and 16 which pass over a pulley 20 suitably mounted in the frame 21 of the classifier. Conveyor belts 13 and 15, however, may pass over a pulley 22 at the end of the classifier frame 21 which is opposed to the shaker table 1. Any suitable means of driving the belts 12 to 16 inclusive may be employed.

The classifier 21 may be provided with a top or table surface 23 provided with an aperture 24 leading into a lamp housing 25 positioned beneath the top 23. The aperture 24 is preferably positioned between the spaced conveyors 13 and 15 on which the halved peaches are carried. It is to be understood that the peaches straddle the opening between the two belts.

Positioned above the lamp housing 25 and above the classifier top 23 may be an air-tight chamber 26 containing a photoelectric cell 27 in operative relation to a window 28 formed in the bottom of the housing forming the chamber 26. The window 28 is preferably in vertical alinement with the aperture 24 of the lamp housing 25. The chamber 26 is preferably made substantially air-tight so as to prevent steam or moisture in the atmosphere from shorting the electrical apparatus contained therein. A thermionic amplifier tube 29 employed in the electric circuit may be positioned in the chamber 26, as shown in Fig. 5.

The bottom of the chamber 26 is spaced from the top 23 of the classifier 21 and may constitute the roof of a chamber provided with end portions made of flexible material, such as black cloth 30 or rubberized fabric suspended from the ends of chamber 26 as indicated in Fig. 4.

The black cloth curtains 30 permit peaches carried by the belts 13 and 15 to enter the space between the chamber 26 and the table top 23 but substantially exclude all extraneous light. An inclined chute 31 may lead off from one side of the chamber formed between the housing of chamber 26 and the table top 23, and a suitable kicker or separating device 32 may be positioned on the opposite side.

The kicker may comprise an electromagnet 33 provided with a movable core 34 and a spring 35 connected to said core and adapted to normally maintain the core in withdrawn position. When the electromagnet is energized, however, the core 34 carrying a suitable end piece 36 is rapidly moved over the belts 13 and 15, pushing the undesired fruit into the chute 31.

It is to be understood that any suitable device equivalent in action to that of a simple electromagnetic separating device described hereinabove may be employed. The kicker or other selecting device may be longitudinally movable on the classifier 21 so as to permit its ready positioning along the path of belts 13 and 15.

Due to mechanical losses and lag in the mechanism employed, the kicker may not be energized under the desired conditions while the fruit is above the aperture 24, and inasmuch as the belts 13 and 15 move continuously it may be necessary to position the kicker in spaced relation to the aperture 24 and closer to the discharge end of the classifier 21.

The lamp housing 25 may contain a projector 37 including a suitable lamp and lenses, said projector being inclined to the horizontal plane but directed toward the aperture 24 so as to illuminate the inner surface of the pit cavity of a fruit 38 carried between belts 13 and 15 when said fruit is above the aperture 24. The projector 37 is thus directed against the lower outer surface of the photoelectric cell housing 26 and said lower surface of said housing is preferably painted with a non-actinic color adapted to absorb the light of the projecting lamp 37 when said light is projected thereon.

A suitable compensating light 40 may be positioned in the projector housing 25, said compensating light preferably comprising a low intensity filament lamp directed through the aperture 24 and through the window 28 in the housing 26 onto the photoelectric cell 27. The purpose of the compensating light 40 will become apparent from the subsequent description.

The lamp housing 25 may also contain a mechanically operated circuit breaker comprising a forked rod 41 extending through the aperture 24 in the top 23 of the classifier 21. The ends of the forked rod 41 closely adjoin the inner edges of the belts 13 and 15, as indicated in Fig. 7. Fork 41 may be connected to a bell crank lever 42 pivoted as at 43 and yieldably urged upwardly through the aperture 24 as by means of a compression spring 44 seating on one end of the bell crank lever 42. The upward movement of the fork 41 may be limited, however, by means of a stop 45 provided with an adjusting screw 46, said adjusting screw forming an electric contact point.

It will be thus seen that when a peach is in position above the aperture 24, the ends of the fork 41 will contact therewith and an electrical connection between the contact 46 and the leg 47 of the bell crank lever 42 will be broken. If, however, there is no peach in position above the aperture 24, the spring 44 will move the fork 41 upwardly through the space between the belts 13 and 15 until contact is made between the leg 47 and the contact point 46.

The purpose of this breaker, operated by the fruit being tested, will be evident from the subsequent description of the circuit.

Figure 1:
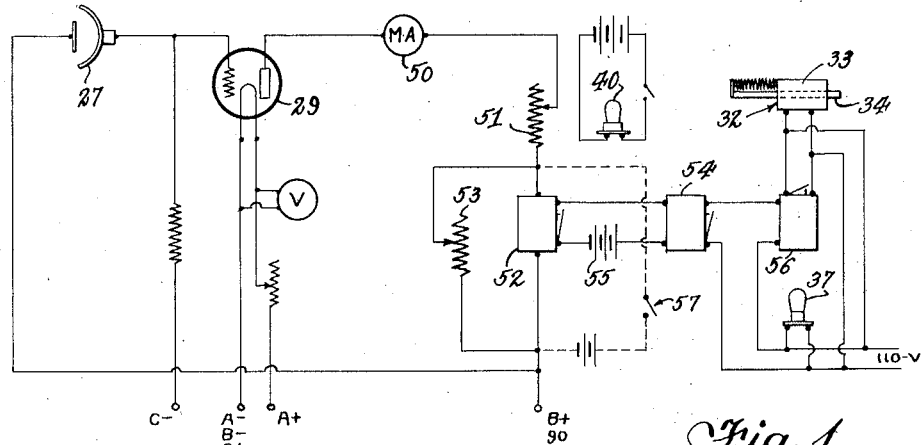
Fig. 1 is a wiring diagram of one circuit which may be employed in carrying out this invention.
Figure 6:
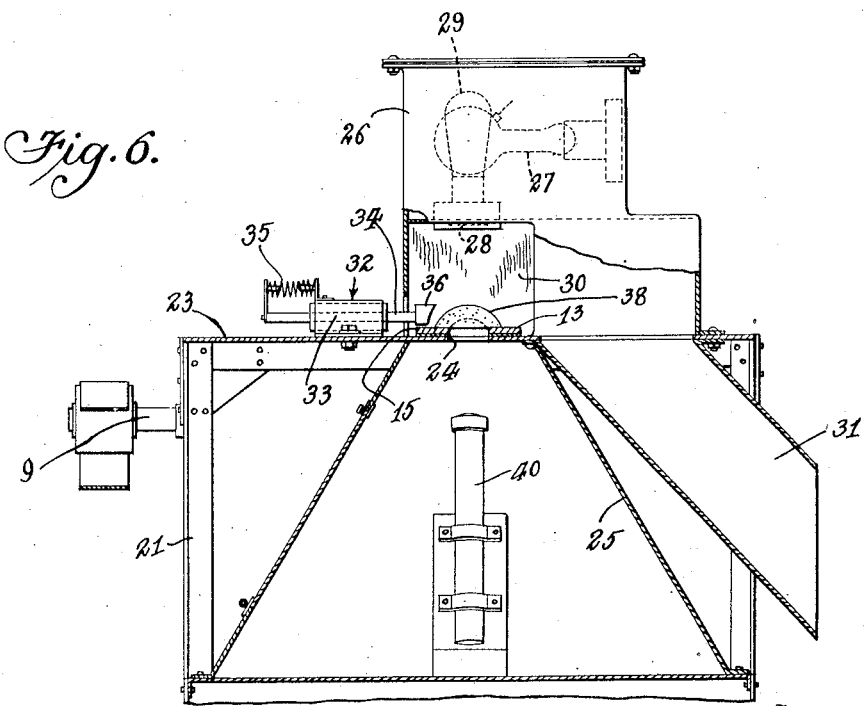
Fig. 6 is a transverse section taken along the plane 6—6 of Fig. 2.

The electric circuit is shown in Fig. 1 and comprises the photoelectric cell 27, a suitable electrical amplifier which may be of any desired description but which for purposes of illustration merely, includes the thermionic tube 29, a milliammeter 50 in the plate circuit of the thermionic tube 29, an adjustable load resister 51 in the line leading to a delicate relay 52, an adjustable shunt resister 53 shunting the delicate relay 52, an intermediate relay 54 operably connected to the relay 52 and including a source of electric energy such as a 6 volt battery 55 and a heavy duty relay 56, adapted to energize the solenoid 33 of the kick-off mechanism 32.

The mechanical circuit breaker including the fork 41, bell crank lever 42 and contact points 46 and 47 is generally indicated in the wiring circuit at 57. The operation of the device disclosed hereinabove is as follows:

After the halved peaches have been properly turned over by the shaker table 1, they are discharged onto the belts 12, 14 and 16, and then fed onto the more rapidly moving belts 13 and 15. The peaches 38 then move into position above the aperture 24.

Before a peach reaches the aperture 24 the fork 41 is impelled upwardly by the spring 44, thus closing the circuit at 57 (Fig. 1) and completing the circuit so as to energize the relay 52 and thus maintaining the control circuit open, whereby the relays 54 and 56 do not go off.

It has been found that the quantity of light transmitted by fruit is proportional to their ripeness and degree of maturity. In other words, a ripe peach when it is in position above the aperture 24 and is illuminated by the projector 37 and the compensating light 40 will glow in much the same manner as a weak lamp. A green peach, however, will not transmit as much light as a ripe peach. Green peaches are of harder consistency and, therefore, reflect more light. Ripe peaches, however, reflect less light but transmit a great deal more.

Whenever a peach is in position above the aperture 24, therefore, and its cup is illuminated by the projector 37 and compensating light 40, the photoelectric cell will be energized by the transmitted light. If the quantity of light transmitted by the peach is sufficient, the circuit will maintain is equilibrium and the peach will go on its way. If, however, the conveyor belts 13 and 15 carry a green peach in position above the aperture 24, such peach will not transmit the necessary quantity of light and, therefore, the energy output of the photoelectric cell will decrease below a desired minimum. Immediately the delicate relay will close, thus energizing the intermediate relay 54, which in turn energizes the heavy duty relay 56, closing the circuit which energizes the solenoid 33 of the kick-off mechanism 32. The kick-off mechanism will thus remove that peach which did not permit the desired quantity of light to be transmitted.

It will be understood that the lights 37 and 40 are constantly lit, but that no light from the projecor 37 reaches the photoelectric cell, except when a peach is over the aperture 24. The compensating light 40 is necessary for the following reasons: some peaches have irregular contours and such a peach may approach the aperture 24 and its forward end depress the fork 41 before the peach has entirely covered the aperture 24. Were it not for the compensating light 40, the portion of the aperture not covered by the peach would transmit no light to the photoelectric cell, since the rays passing from the projector 37 through this portion would not be deflected, and would consequently fall on the bottom of the chamber 26. At this instant the connection being broken at 57, the light falling on the photoelectric cell may be insufficient to maintain the circuit in equilibrium, and the relay 52 will thereupon close and actuate the kicker 32; thus discarding a peach, which may be of the proper degree of ripeness. To prevent this, the compensating light 40 is of sufficient intensity to maintain the relay 52 closed when no peach is over the aperture 24. It will thus be seen that should a peach actuate the fork 41 before covering the aperture 24, the light emitted by the compensating light 40 will compensate for that not transmitted by the peach, by reason of its not fully covering the aperture 24.

It is understood, of course, that should the peach be green, as soon as it fully covers the aperture 24, the kicker mechanism will be actuated, the sole purpose of the compensating light 40 being to insure that the degree of ripeness of the peach be not measured until the peach fully covers the aperture 24.

It has been found that the sensitivity of the apparatus is materially increased when the grid resistance is reduced and the C-battery voltage increased in comparison with those values which are ordinarily recommended for use with photoelectric equipment. For example, when 60 megohms grid resistance was employed a 4½ volt C-battery and a 110 volt B-battery, the penetration tests made as described hereinabove showed 1.9 milliamps on green peaches and 3.1 milliamps on ripe peaches. The variation here is 1.2 milliamps. However, by decreasing the grid resistance to 20 megohms and by employing a B-battery voltage of 110 volts and a C-battery voltage of 12 volts, variations of from 3 to about 5 milliamps were obtained between green and ripe peaches. Green peaches showed readings of from 0.5 to about 1.5, whereas ripe peaches gave milliammeter readings of from about 4 to 5.2. It will be readily understood that much more sensitive classification is possible where the differences in milliammeter readings between green and ripe fruits are greater.

In order to maintain the amplifier and photoelectric circuit at higher voltages, the load resister 51 is employed. The shunt resister 53, however, maintains a low voltage across the sensitive relay 52. The combination of variable resistances 51 and 53, therefore, permits a more accurate control of current conditions within the circuit.

The sensitive relay 52 may be carefully adjusted so as to become operative whenever the current in-put deviates ½ milliamp or more from a predetermined setting. In this manner accurate separation may be obtained between green, partially green, ripe and over-ripe fruits, the fruit passing through a battery of testing or classifying tables of the character described.

Fig. 5 shows a modification of the apparatus shown in Fig. 7, the only difference between the apparatus shown in Fig. 5 and that shown in Fig. 7 being that whereas in Fig. 7 the relay 52 is battery operated, in Fig. 5 the compensating light 40 is of sufficient strength to actuate it alone, thus eliminating the operating mechanism. When a peach is over the aperture 24, if it be of the proper degree of ripeness, sufficient light will pass through it from the lights 37 and 40 to maintain equilibrium in the circuit, so that the relays do not go off. If, however, the peach is green, the passage of light therethrough will be sufficiently interrupted so that the relay 52 is de-energized enough to go off, and thus operate the kicker 32 and discard the fruit.

Thereupon, the light from the compensating light 40 again falls on the photoelectric cell, and its intensity is sufficient to reset the relay 52. In the apparatus shown in Fig. 7, the strength of the compensating light 40 is insufficient to set the relay, the battery being relied upon to do this when the circuit is closed at 57, but its strength is sufficient to maintain the relay in closed position after the battery closes it.

It is to be understood that the invention is not limited to the measurement of the intensity of light passing through portions of a fruit, such as a part of a peach. Similar results may be obtained by passing light through whole fruit, such as for example, oranges or lemons and thus automatically classifying them into ripe and green fruit.

The method disclosed hereinabove may be employed wherever the pit or seed is of sufficiently small size to permit a quantity of light to pass through the fruit. Furthermore, two projectors substantially at right angles to each other may be caused to operate on two photoelectric cells, so that the kicker mechanism is energized when either both or only one of the photoelectric cells is improperly energized by the light passing through the fruit. In this manner, fruits which have a green side or portion may be segregated from fruit which are thoroughly ripe.

We claim:

1. A method of grading fruit for ripeness, comprising subjecting fruit to illumination substantially uniform in intensity, measuring the intensity of light transmitted through the fruit, and sorting the fruit according to a scale of such intensities.

2. A method of classifying fruit as to degrees of maturity, comprising imposing a light upon fruit successively, receiving light transmitted through the fruit upon a light sensitive cell, and automatically separating those fruits which fail to transmit light of a predetermined intensity.

3. A method of grading fruit as to degree of ripeness comprising orienting fruit to be graded, continuously moving the oriented fruit, projecting a light through the moving oriented fruit, receiving light transmitted through the fruit upon a light sensitive cell, and sorting the fruit according to the response of such light sensitive cell to light transmitted through said fruit.

4. In a device for selectively classifying fruit, the combination of a photoelectric cell adapted to receive light transmitted through fruit at a point of selection, light projecting means adapted to project a light of substantially uniform intensity upon fruit at a point of selection, means for bringing fruit to be tested to said point of selection, a thermionic tube circuit connected to said photoelectric cell and adapted to amplify current variations of said photoelectric cell, means for measuring said amplified current variations, and means for maintaining the current output of said photoelectric cell at a predetermined minimum.

5. In a device for selectively classifying fruit, the combination of a photoelectric cell adapted to receive light transmitted through fruit at a point of selection, light projecting means adapted to project a light of substantially uniform intensity upon fruit at a point of selection, means for bringing fruit to be tested to said point of selection, a thermionic tube circuit connected to said photoelectric cell and adapted to amplify current variations of said photoelectric cell, means for measuring said amplified current variations, and means for maintaining the current output of said photoelectric cell at a predetermined minimum, said last named means comprising a compensating light directed onto said photoelectric cell.

6. In a device for selectively classifying fruit, the combination of a light sensitive cell adapted to receive light transmitted through fruit at a point of selection, light projecting means adapted to impose a beam of light upon fruit at said point of selection, means for bringing fruit to be classified in spaced relation to said point of selection, a thermionic tube circuit connected to said light sensitive cell and adapted to amplify current variations thereof, electromagnetic means electrically related to said circuit and controlled thereby for removing fruit which do not transmit a predetermined minimum quantity of light from said conveying means, and means actuated by said fruit for maintaining the current output of said light sensitive cell at a predetermined minimum when no fruit are at said point of selection.

7. In a device for selectively classifying fruit, the combination of a light sensitive cell adapted to receive light transmitted through fruit at a point of selection, light projecting means adapted to impose a beam of light upon fruit at said point of selection, means for bringing fruit to be classified in spaced relation to said point of selection, a thermionic tube circuit connected to said light sensitive cell and adapted to amplify current variations thereof, electromagnetic means electrically related to said circuit and controlled thereby for removing fruit which do not transmit a predetermined minimum quantity of light from said conveying means, and means actuated by said fruit for maintaining the current output of said light sensitive cell at a predetermined minimum and for resetting said electromagnetic means when there are no fruit at said point of selection.

8. In a device for selectively classifying fruit, the combination of means for moving fruit past a selecting point, a light directed upon said selecting point and adapted to impinge upon said fruit, a photoelectric light sensitive cell adapted to receive light transmitted through fruit at said selecting point, an electromagnetic device electrically related to said cell and controlled thereby, and means for maintaining the current output of said photoelectric cell at a predetermined minimum.

9. In a device for selectively classifying fruit, the combination of means for moving fruit past a selecting point, a light directed upon said selecting point and adapted to impinge upon said fruit, a photoelectric light sensitive cell adapted to receive light transmitted through fruit at said selecting point, an electromagnetic device electrically related to said cell and controlled thereby, and means actuated by said fruit for maintaining the current output of said photoelectric cell at a predetermined minimum when no fruit are at said point of selection.

10. In a device for selectively classifying fruit, the combination of means for moving fruit past a selecting point, a light directed upon said selecting point and adapted to impinge upon fruit at said point, a photoelectric light sensitive cell adapted to receive light transmitted through fruit while at said selecting point, an electromagnetic device electrically related to said cell and controlled thereby for removing fruit from said moving means when light of a predetermined intensity is not transmitted through said fruit, means for resetting said electromagnetic device after each response thereof, and means for maintaining the current output of said photoelectric cell at a predetermined minimum.

11. A device for selectively classifying fruit comprising a pair of spaced parallel conveyor elements for moving fruit past a point of selection, means for driving said conveyor elements in unison, light projecting means directed upon fruit at said point of selection, a photoelectric light sensitive cell adapted to receive light transmitted through fruit while at said point of selection, an electric circuit operably connected to said light sensitive cell and adapted to amplify its response, electromagnetic means electrically related to said circuit and controlled by differences in response thereof for selectively removing fruit from said conveying means, and means for maintaining the current output of said photoelectric cell at a predetermined minimum.

12. In a method of classifying fruit as to degrees of maturity, the steps of continuously moving fruit in spaced relation to each other, projecting a light through the moving fruit, receiving light transmitted through the fruit upon a light sensitive cell, sorting the fruit according to the response of such light sensitive cell to light transmitted through said fruit, and projecting light directly upon said light sensitive cell when no light is being transmitted through a fruit.

13. A method of classifying fruit as to degrees of maturity, comprising imposing a light of substantially uniform intensity upon fruit successively, receiving light transmitted through the fruit upon a light-sensitive cell, and automatically separating those fruits which fail to transmit light of a predetermined intensity.

ALBERT R. THOMPSON.
KAARE OMSTED.